United States Patent
Rees et al.

(10) Patent No.: US 6,642,457 B2
(45) Date of Patent: Nov. 4, 2003

(54) INSULATOR FOR AN ELECTRICAL BUSBAR SYSTEM, AS WELL AS AN INSULATOR SYSTEM HAVING SUCH INSULATORS

(75) Inventors: Jochen Rees, Waldshut (DE); Peter Maier, Herrischried (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 10/162,654

(22) Filed: Jun. 6, 2002

(65) Prior Publication Data

US 2002/0185300 A1 Dec. 12, 2002

(30) Foreign Application Priority Data

Jun. 11, 2001 (EP) .............................. 01810560

(51) Int. Cl.⁷ .............................................. H01B 17/00
(52) U.S. Cl. ................ 174/149 B; 174/68.2; 174/88 B; 361/650; 439/210; 439/213
(58) Field of Search ............................. 174/68.2, 71 B, 174/72 B, 88 B, 99 B, 149 B; 361/650; 439/210, 213

(56) References Cited

U.S. PATENT DOCUMENTS

| | | | | |
|---|---|---|---|---|
| 3,609,215 A | * | 9/1971 | Giger et al. ............... | 174/99 B |
| 3,742,121 A | * | 6/1973 | Schmidt ..................... | 174/72 B |
| 3,786,394 A | * | 1/1974 | Koenig et al. ............. | 174/88 B |
| 3,922,053 A | * | 11/1975 | Hafer ........................ | 174/68.2 |
| 4,002,388 A | * | 1/1977 | Menocal .................... | 174/72 B |
| 4,174,143 A | * | 11/1979 | Hicks et al. ............... | 174/88 B |
| 4,627,680 A | | 12/1986 | Weimer et al. | |
| 4,842,533 A | * | 6/1989 | Beberman et al. ......... | 174/88 B |
| 5,261,830 A | * | 11/1993 | Jego et al. .................. | 439/210 |
| 5,760,339 A | * | 6/1998 | Faulkner et al. .......... | 174/88 B |
| 5,783,779 A | * | 7/1998 | Graham et al. ........... | 174/88 B |

FOREIGN PATENT DOCUMENTS

EP          0877460 A2    11/1998

* cited by examiner

*Primary Examiner*—Dean A. Reichard
*Assistant Examiner*—Adolfo Nino
(74) *Attorney, Agent, or Firm*—Burns, Doane, Swecker & Mathis, L.L.P.

(57) ABSTRACT

An insulator is specified for an electrical busbar system having at least one rail (5), which is in the form of an integral axially symmetrical body (1) and has a hole (3) along the axis of symmetry (2), with a mounting surface (4), which is vertically at a distance from the hole (3) and extends radially as far as the rim region of the body (1), being provided on each of the end faces of the body (1) with respect to the axis of symmetry (2), in order to make flat contact with a rail (5). Furthermore, an essentially ribbed first surface (6) extends in the radial direction between the hole (3) and the mounting surface (4). Furthermore, an insulator system having at least two insulators is disclosed.

12 Claims, 2 Drawing Sheets

INSULATOR FOR AN ELECTRICAL BUSBAR SYSTEM, AS WELL AS AN INSULATOR SYSTEM HAVING SUCH INSULATORS

This application claims priority under 35 U.S.C. §§119 and/or 365 to Appln. No. 01810560.1 filed in Europe on Jun. 11, 2001; the entire content of which is hereby incorporated by reference.

FIELD OF THE INVENTION

The present invention relates to the field of insulation and electrical conductor technology. It relates in particular to an insulator for an electrical busbar system, as well as an insulator system having at least two such insulators, as claimed in the precharacterizing clause of the independent claims.

BACKGROUND OF THE INVENTION

Nowadays, insulators for electrical busbar systems are used in a wide range of power-electronic circuits, in particular in converter circuits, for insulating live rails from one another and from ground potential. Normally, such an electrical busbar system has at least one rail which carries an electric current and whose voltage potential is not ground potential. In a busbar system having two or more rails, the individual rails are at different voltage potentials. The rails are routed close to one another in order to provide a low-inductance connection, for example between the circuit breakers in a converter circuit and an energy store for this converter circuit, in particular a DC intermediate circuit, with known insulators being used to insulate them from one another and from ground potential. One such insulator is in the form of an axially symmetrical insulator body which has a hole along the direction of the axis of symmetry. Furthermore, a mounting surface which is vertically at a distance from the hole and extends radially as far as the rim region of the body, is provided on each of the end faces of the body with respect to the axis of symmetry, in order to make flat contact with a rail. Furthermore, the body has a multi-part construction composed of insulator body parts, which are stacked in the direction of the axis of symmetry. This results in a sufficiently long creepage distance in the direction of the axis of symmetry to provide insulation between two rails. Each insulator body part is formed from a multilayer, in particular glass-fiber-reinforced, insulation material, such as HM35.

One problem with a multipart design such as this is that a large number of insulator body parts are required to achieve a sufficiently long creepage distance in the direction of the axis of symmetry. A body such as this formed from insulator body parts requires a considerable amount of space, however, and is susceptible to mechanical influences, in particular bending stresses, transversely with respect to the direction of the axis of symmetry. Such mechanical influences occur, for example, in the event of a current surge on a live rail which is routed close to another rail or close to ground potential and is separated by the body from the other rail or the ground potential. This can result in partial discharges between the insulator body parts and in flashovers between the rails, or between one rail and ground potential, in which case the body may be damaged or destroyed. The insulator then no longer ensures that a sufficient amount of insulation is provided. Furthermore, the multi-part design of the insulator described above is highly intensive in terms of assembly and maintenance.

Normally, a ground potential rail runs through the hole in the body. In order to achieve a sufficiently long creepage distance between this ground potential rail and a rail located on the mounting surface, a cutout is provided in the direction of the axis of symmetry in the rail resting on the surface, which cutout is many times larger than the hole in the body, in order to maintain the creepage distance which is required for insulation between the rail resting on this surface and the ground potential rail. When a high power level is to be transmitted via such a rail, however, the rail must be designed to have a very large area in order to allow it to carry the high current associated with the high power level. However, a rail designed in this way occupies a large amount of space, uses a large amount of material, and is thus expensive. Furthermore, a rail designed in such a way requires a number of insulators alongside one another, thus resulting in further material costs, in particular component costs.

In addition, the insulator described above is not suitable for forming an insulator system from a number of bodies, since the mechanical influences which occur as mentioned above can lead to the insulator system not being mechanically robust, in which case the insulator system may be damaged or destroyed. Furthermore, an insulator system formed from a number of insulators as described above requires a considerable amount of space.

SUMMARY OF THE INVENTION

One object of the invention is therefore to specify an insulator for an electrical busbar system having at least one rail, which insulator is distinguished by providing a high level of insulation while being resistant to partial discharges and flashovers, and which has a particularly simple, robust design, which is space-saving, and hence is cost-effective. Another object is to specify an insulator system which comprises at least two insulators according to the invention, has a space-saving design, and is very largely resistant to mechanical influences. These objects are achieved by the features of claims 1 and 9. The dependent claims specify advantageous developments of the invention.

The insulator according to the invention is in the form of an axially symmetrical body and has a hole along the axis of symmetry, with a mounting surface, which is vertically at a distance from the hole and extends radially as far as the rim region of the body, being provided on each of the end faces of the body with respect to the axis of symmetry, in order to make flat contact with one rail in the busbar system. According to the invention, the body is formed integrally, as a result of which the body advantageously has a very high level of intrinsic mechanical robustness, so that mechanical influences such as those which occur in the event of a current surge in a live rail which is resting on the mounting surface and is routed close to another rail or close to ground potential have virtually no influence on the insulator. Partial discharges on and in the body as well as flashovers between rails or between one rail and ground potential can thus be successfully prevented, so that the insulator provides a high level of insulation.

Furthermore, according to the invention, an essentially ribbed first surface extends in the radial direction between the hole and the mounting surface. A cutout which is normally provided on a rail resting on the mounting surface can advantageously be chosen to be small, since the creepage distance (which is required for insulation) between the rail resting on this surface and a ground potential rail (which normally runs through the hole) is achieved via the ribbed first surface. The end faces of the body of the insulator and the rail resting on it can thus be designed to be highly space-saving in terms of the area, and hence cost-effective, particularly when a high power level is to be transmitted via such a rail. Furthermore, this makes it possible to produce a light insulator, which uses little material and is thus cost effective.

In the insulator system according to the invention, at least two insulators according to the invention are provided, whose bodies are arranged to be aligned in the direction of the axis of symmetry and form a stack. Furthermore, one of the mounting surfaces of in each case two adjacent bodies is pressed against a rail which is arranged between the two bodies. This results in the insulators in the insulator system forming an extremely compact assembly, which is intrinsically highly robust and is largely resistant to mechanical influences. Furthermore, the aligned arrangement of the bodies of the insulators results in the insulator system having a highly space-saving design. In addition, the first surface of each body of the associated insulator can advantageously be protected against dirt and environmental influences.

These and further objects, advantages and features of the present invention will become evident from the following detailed description of preferred exemplary embodiments of the invention, in conjunction with the drawings.

Figure 1:
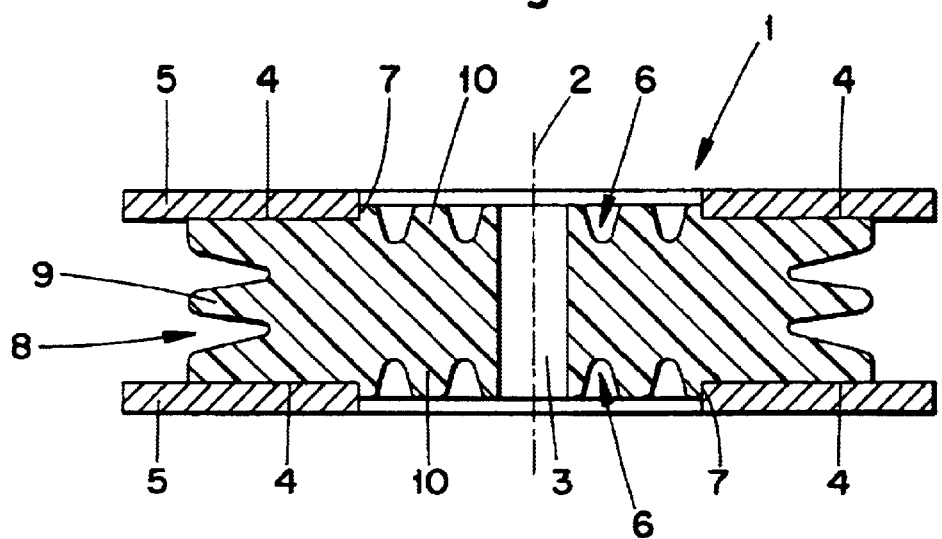
FIG. 1 shows a section illustration of one embodiment of an insulator according to the invention for an electrical busbar system.

The reference symbols used in the drawing and their meanings are listed, in summarized form, in the list of reference symbols. In principle, identical parts are provided with the same reference symbols in the figures. The described embodiments represent examples of the subject matter of the invention and have no restrictive effect.

DETAILED DESCRIPTION OF THE INVENTION

FIG. 1 shows a section illustration of one embodiment of an insulator according to the invention for an electrical busbar system having at least one rail 5.

As shown in FIG. 1, the insulator according to the invention has a body 1 which is axially symmetrical with respect to an axis of symmetry 2. The body 1 has a hole 3 along this axis of symmetry 2, through which a ground potential rail normally runs, although, for the sake of clarity, this is not shown. Furthermore, a mounting surface 4 which is vertically at a distance from the hole 3 and extends radially as far as the rim region of the body 1, is provided on each of the end faces of the body 1 with respect to the axis of symmetry 5. This mounting surface 4 is used to provide the flat contact for a rail 5 in an electrical busbar system. As shown in FIG. 1, one such rail 5 rests on each mounting surface 4 of the body 1 and is a rail 5 essentially in the form of a plate, in which case, as is known, the rails 5 carry an electric current and are of different voltage potentials from one another and from ground potential.

According to the invention and as shown in FIG. 1, the body 1 is integral, so that the body 1 is advantageously mechanically very highly robust. Mechanical influences which can occur when the insulator is used in a severe environment thus have virtually no influence on the insulator. Furthermore, the insulator is very largely resistant to mechanical influences such as those which can occur in the event of a current surge in a live rail 5 which is routed close to another rail or close to ground potential.

Figure 2:
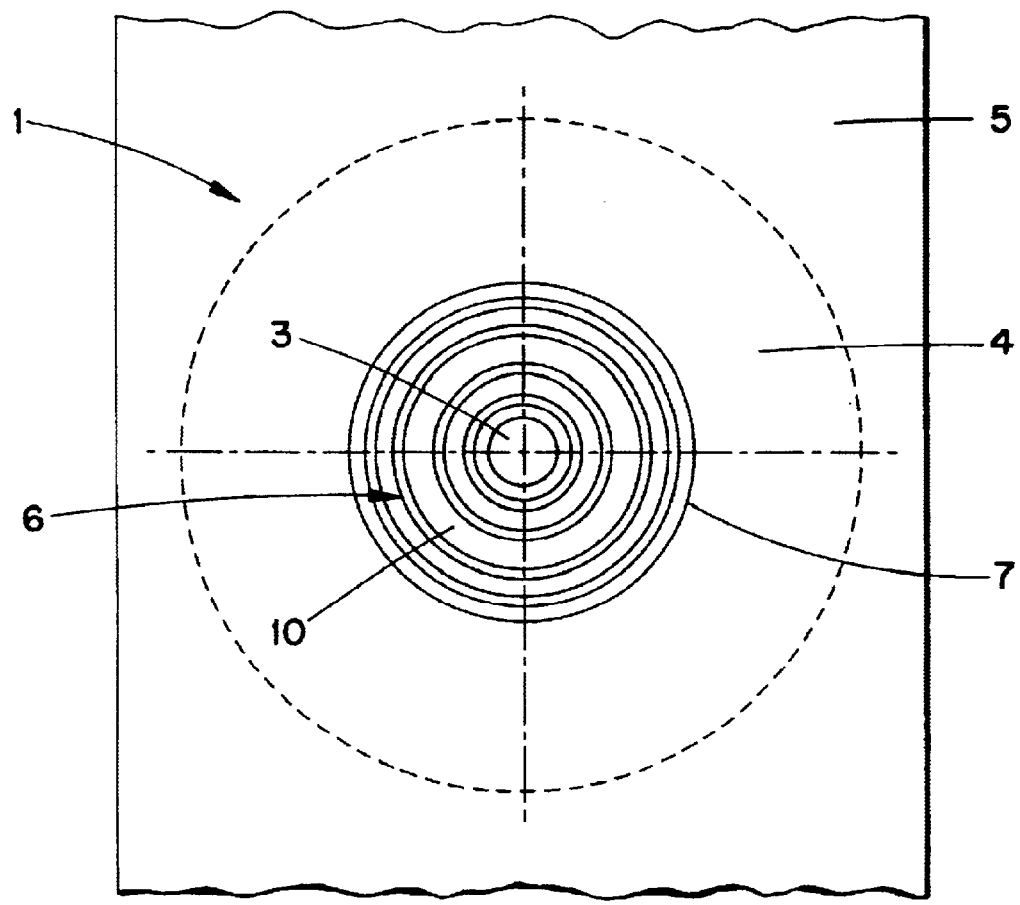
FIG. 2 shows a plan view of the insulator according to the invention.

According to the invention, as shown in FIG. 1 and as shown in the plan view of the insulator according to the invention in FIG. 2, an essentially ribbed first surface 6 extends in the radial direction between the hole 3 and the mounting surface 4. The ribs 10 on the first surface 6 preferably each have an essentially trapezoidal cross section. A cutout, which is provided as shown in FIG. 1 and FIG. 2, in the rail 5 which rests on the mounting surface 4 can thus advantageously be chosen to be small, since the creepage distance which is required for the insulation between the rail 5 and the ground potential rail which runs through the hole 3 but is not shown, for the sake of clarity, is achieved by means of the essentially ribbed first surface 6. The insulator and the rail 5 can thus be designed in a highly space-saving manner, since the end faces of the body 1 and the rail 5 need not be designed, in terms of surface area, to be as long as embodiments that are known from the prior art, in particular when a high power level is to be transmitted via the rail 5.

In the embodiment of the insulator according to the invention shown in FIG. 1 and FIG. 2, the body 1 is rotatationally symmetrical with respect to the axis of symmetry 2, in particular having a circular cross section. The junction from the first surface 6 to the mounting surface 4 in FIG. 1 is in the form of a step 7, which drops from the first surface 6 toward the mounting surface 4. Since the first surface 6, as shown in FIG. 2, is preferably circular, the junction, which is in the form of a step 7 toward the mounting surface 4, is likewise circular. As shown in FIG. 1, one edge of the cutout in the rail 5, which rests on the mounting surface 4, rests on the step 7, with the cutout advantageously having essentially the same dimensions as the first surface 6. This prevents the mechanical influences which have been mentioned above and which may possibly occur from moving the rail 5 transversely with respect to the direction of the axis of symmetry. Furthermore, assembly can advantageously be made easier.

In order to insulate the rails 5 from one another in the direction of the axis of symmetry, an outer surface, with respect to the axis of symmetry 2, of the body 1 has an essentially ribbed second surface 8, according to the invention. The ribs 9 on the second surface 8 preferably each have an essentially triangular cross section. The second surface 8 is advantageously bounded by the mounting surfaces 4 in the direction of the axis of symmetry. The distance between the rails 5 in the direction of the axis of symmetry can thus be reduced, since the creepage distance which is required for insulation between the rails 5 is achieved by means of the essentially ribbed second surface 8. The insulator can thus advantageously be designed in a highly space-saving manner in the direction of the axis of symmetry, and it is also possible to save weight, material and hence costs.

As already mentioned above, the body 1 of the insulator according to the invention is integral. According to the invention, the body 1 is formed from an insulation material which can be poured or cast, which means that the advantageous integral nature of the body 1 can be achieved in a particularly simple manner. Furthermore, the first surface 6 and the second surface 8, in particular their ribs 8, 9, can be produced without any problems by casting an insulation material which can be poured or cast, without any need for material cutting machining, in particular such as turning or grinding.

Figure 3:
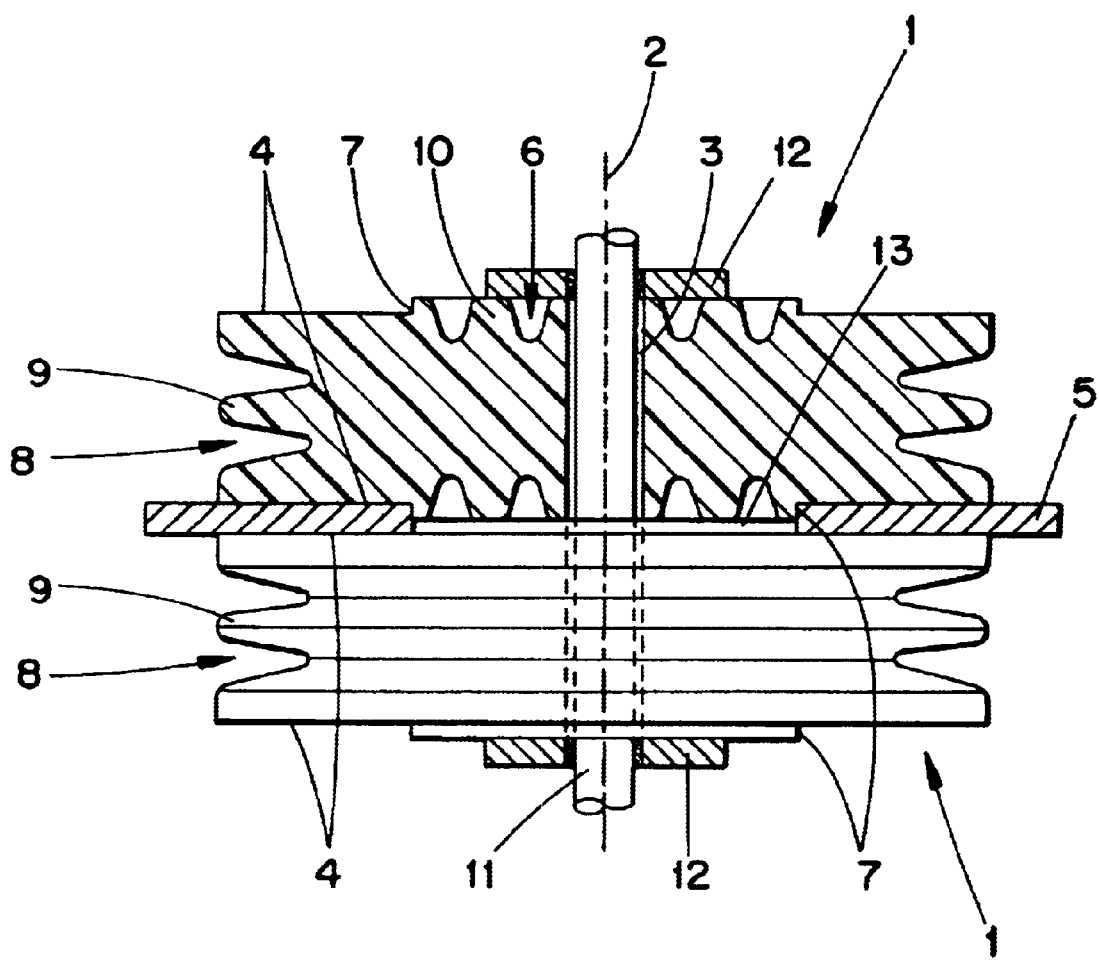
FIG. 3 shows a half-section illustration of one embodiment of an insulator system according to the invention.

FIG. 3 shows an illustration, in the form of a half section, of one embodiment of an insulator system according to the invention. The insulator system according to the invention and as shown in FIG. 3 has at least two insulators according to the invention, whose bodies 1 are, according to the invention, arranged to be aligned in the direction of the axis of symmetry, and form a stack. Furthermore, one of the mounting surfaces 4 of in each case two adjacent bodies 1 is pressed against a rail 5 which is arranged between the two bodies 1 and, as already described above, corresponds to the embodiment described in FIG. 1 and FIG. 2. The compression results in the insulators in the insulating system forming an extremely compact assembly, which is intrinsically highly robust. Furthermore, the aligned arrangement of the bodies 1 in the insulators results in the insulator system having a highly space-saving design. If an appropriately thick rail 5 is used, against which the two bodies 1 are pressed, a cavity 13 is formed between the two adjacent bodies 1. As shown in FIG. 3, the cavity 13 is bounded in the direction of the axis of symmetry by two of the essentially ribbed first surfaces 6 of the adjacent bodies 1, with these two first surfaces 6 facing one another. The cavity 13 is sealed off from dirt and environmental influences, and thus protects the mutually facing first surfaces 6 of the adjacent bodies 1 against these influences. Furthermore, with regard to its surface roughness, the first surface 6 can thus be designed for a lower dirt level, so that this also makes it possible to save significant costs, in particular production costs. The cavity 13 also ensures that the compression force acts exclusively on the respective mounting surfaces 4 of the associated bodies and on the rail 5 which is arranged between the bodies 1, so that there is advantageously no need to design the first surface 6 in a complex manner to absorb this compression force.

Furthermore, as shown in FIG. 3, a tie rod 11 is provided, which passes through the respective holes 3, along the axis of symmetry 2, in the associated bodies 1. A tightening device 12 is arranged at the tie rod ends beyond the end faces of the stack, is used to apply compression force to the stack of bodies 1 and results in the bodies 1 together with the rail 5 forming a very robust assembly. The tie rod 11 is at ground potential, particularly if the tie rod 11 is also used for securing the insulator system in a converter circuit, and is preferably formed from a nonmagnetic material, so that the tie rod 11 is not magnetized by the live rail 5, thus advantageously making it possible to avoid magnetic and inductive influences originating from the tie rod 11, or produced in the tie rod 11.

According to the invention, the tightening device 12 rests, with respect to the axis of symmetry 2, on the end faces of the stack of bodies 1, in each case on the essentially ribbed first surface 6 of the associated body 1. This contact by the tightening device 12 results in an insulator system which occupies little space, in particular at right angles to the direction of the axis of symmetry, since, at right angles to the direction of the axis of symmetry, the tightening device 12 does not extend as far as the mounting surface 4, or beyond the mounting surface 4, or does not extend beyond the cross sectional surface of the body 1 or of the stack of bodies 1.

Overall, the insulator according to the invention and the insulator system according to the invention represent a particularly simple, and hence cost-effective and reliable solution, which is distinguished primarily by its robust design and by its very high level of resistance, as described above, to mechanical influences.

LIST OF REFERENCE SYMBOLS

1 Body
2 Axis of symmetry
3 Hole
4 Mounting surface
5 Rail
6 First surface
7 Step
8 Second surface
9 Ribs on the second surface
10 Ribs on the first surface
11 Tie rod
12 Tightening device
13 Cavity

What is claimed is:

1. An insulator for an electrical busbar system which is in the form of an axially symmetrical body and has a hole along the axis of symmetry, with a mounting surface, which is vertically at a distance from the hole and extends radially as far as the rim region of the body, being provided on each of the end faces of the body with respect to the axis of symmetry, in order to make flat contact with a rail, wherein the body is formed integrally, and wherein an essentially ribbed first surface extends in the radial direction between the hole and the mounting surface, and wherein an outer surface of the body with respect to the axis of symmetry has an essentially ribbed second surface.

2. The insulator as claimed in claim 1, wherein the junction from the first surface to the mounting surface is in the form of a step.

3. The insulator as claimed in claim 1, wherein the essentially ribbed second surface is bounded in the direction of the axis of symmetry by the mounting surface.

4. The insulator as claimed in claim 1, wherein ribs on the essentially ribbed second surface each have an essentially triangular cross section.

5. The insulator as claimed in claim 1, wherein ribs on the essentially ribbed first surface each have an essentially trapezoidal cross section.

6. The insulator as claimed in claim 1, wherein the body is rotationally symmetrical.

7. The insulator as claimed in claim 1, wherein the body is formed from an insulation material which can be poured or cast.

8. An insulator system having at least two insulators as claimed in claim 1, wherein the bodies of the insulators are arranged to be aligned in the direction of the axis of symmetry and form a stack, whereby two adjacent bodies being pressed to one of the mounting surfaces in each case against a rail.

9. The insulator system as claimed in claim 8, wherein a cavity is formed between two adjacent bodies, and wherein the cavity is bounded in the direction of the axis of symmetry by two of the essentially ribbed first surfaces of the adjacent bodies, with the two first surfaces facing one another.

10. The insulator system as claimed in claim 9, wherein the tie rod is composed of a nonmagnetic material.

11. The insulator system as claimed in claim 8, wherein tie rod is passed through the respective holes and the associated bodies.

12. The insulator system as claimed in claim 11, wherein a tightening device for applying compression force to the stack is arranged at the tie rod ends, with the tightening device resting, with respect to the axis of symmetry, on the end faces of the stack, in each case on the essentially ribbed first surface of the associated body.

* * * * *